United States Patent
James

(10) Patent No.: US 11,936,801 B2
(45) Date of Patent: Mar. 19, 2024

(54) MOBILE TELEPHONE DEVICE AND METHOD FOR INHIBITING UNDESIRED CALLS

(71) Applicant: Patmos Unipessoal LDA, Madeira (PT)

(72) Inventor: Robert James, Hatfield (GB)

(73) Assignee: Patmos, Unipessoal LDA, Funchal (PT)

( * ) Notice: Subject to any disclaimer, the term of this patent is extended or adjusted under 35 U.S.C. 154(b) by 220 days.

(21) Appl. No.: 17/602,882

(22) PCT Filed: Apr. 11, 2019

(86) PCT No.: PCT/IB2019/053013
§ 371 (c)(1),
(2) Date: Oct. 11, 2021

(87) PCT Pub. No.: WO2020/208405
PCT Pub. Date: Oct. 15, 2020

(65) Prior Publication Data
US 2022/0166869 A1     May 26, 2022

(51) Int. Cl.
*H04M 1/67*     (2006.01)
*H04M 1/72412*  (2021.01)
*H04M 1/72454*  (2021.01)
*H04M 1/725*    (2021.01)

(52) U.S. Cl.
CPC ......... *H04M 1/67* (2013.01); *H04M 1/72412* (2021.01); *H04M 1/72454* (2021.01); *H04M 1/725* (2013.01)

(58) Field of Classification Search
CPC ............... H04M 1/67; H04M 1/72412; H04M 1/72454; H04M 1/725
See application file for complete search history.

(56) References Cited

U.S. PATENT DOCUMENTS

| 2004/0204123 | A1* | 10/2004 | Cowsky, III | H04M 1/724 455/565 |
| 2011/0081859 | A1* | 4/2011 | Chung | H04M 1/6066 455/569.1 |
| 2013/0084834 | A1* | 4/2013 | Tivyan | H04M 15/848 455/414.1 |

FOREIGN PATENT DOCUMENTS

| CN | 108 540 669 A | 9/2018 |
| EP | 1 613 038 A2 | 1/2006 |
| EP | 2 369 821 A1 | 9/2011 |
| EP | 2369821 A1 * | 9/2011 | ............. H04M 1/67 |
| EP | 3258678 A1 * | 12/2017 |

OTHER PUBLICATIONS

International Search Report dated Oct. 22, 2019, issued in PCT Application No. PCT/IB2019/053013, filed Apr. 11, 2019.
Written Opinion dated Oct. 22, 2019, issued in PCT Application No. PCT/IB2019/053013, filed Apr. 11, 2019.

* cited by examiner

*Primary Examiner* — Farid Seyedvosoghi
(74) *Attorney, Agent, or Firm* — Workman Nydegger

(57) ABSTRACT

A mobile telephone device and a method for inhibiting undesired calls through the mobile telephone device are provided, wherein the method includes an acquisition phase, wherein at least one operating condition signal generated at the end of a first call is acquired through an input included in the mobile telephone device, and a temporary inhibition phase, wherein a processor inhibits the making of calls through the mobile telephone device for a preset time interval on the basis of the operating condition signal.

17 Claims, 2 Drawing Sheets

MOBILE TELEPHONE DEVICE AND METHOD FOR INHIBITING UNDESIRED CALLS

BACKGROUND OF THE INVENTION

1. The Field of the Invention

The present invention relates to a mobile telephone device (such as, for example, a smartphone, a tablet, or the like) and to a method for inhibiting calls from said mobile device; in particular, unintentional calls such as, for example, those made by the user as a consequence of a fortuitous movement or gesture.

2. The Relevant Technology

As is known, telephone networks, whether traditional or VoIP (Voice Over IP), are a widespread and broadly available means of communication, i.e., they are available throughout the world and are easily accessible in different ways (e.g., from a public fixed telephone, from a mobile terminal, from a shared line in a hotel, or the like). This makes telephone calls the faster and most accessible medium for communicating and exchanging information during a remote conversation between two people.

In the course of a day, many people send and/or receive important news over the phone, such as, for example, the evolution of a disease or the death of a loved one, the end of a personal relationship, the progress of a commercial negotiation, the trend of a company or stock securities, or the like.

Important news, when sent or received during a phone call, may cause an emotional change in the mood of one of the interlocutors. It is therefore not unusual that one of the interlocutors will be, when the phone call is over, in an altered emotional state, e.g., a state of anger, dejection, happiness or excitement.

Especially when a person is in an altered emotional condition, he/she may unintentionally make unexpected, or anyway uncontrolled, actions or gestures; this is the case, for example, when phone calls are accidentally started.

Also in normal situations it may happen that the owner of a mobile telephone device, in particular a device commonly known as smartphone, equipped with a touchscreen, inadvertently makes a new call immediately after having ended a previous call. This is rather likely to occur with such mobile phones or devices, in that their operation can be controlled via the touchscreen by simply lightly touching it or by touching controls generally consisting of icons.

It is a common experience, in fact, that when a mobile telephone device is laid on a flat surface (a table or a desk), or is put into a pocket or a bag after having terminated a call, the user may unintentionally touch an icon or another control, thus accidentally initiating a call.

SUMMARY OF THE INVENTION

The present invention aims at solving this and other problems by providing a method for inhibiting the activation of undesired phone calls from a mobile telephone device.

The present invention also aims at providing a mobile telephone device capable of implementing such method, thus temporarily preventing any other calls from being made after the end of a phone call.

The basic idea of the present invention is to temporarily inhibit or prevent a mobile telephone device (e.g., a smartphone, a tablet, or the like) from making calls on the basis of a signal generated at the end of a phone call made by the user.

Said signal is representative of, or is associated with, a quantity relating to the telephone device itself or to the surrounding environment (e.g., background noise), or relates to an external apparatus in communication with the mobile telephone device, e.g., an earphone, a microphone or the like.

More specifically, without however being limited thereto, said signal is indicative of an operating condition of the mobile telephone device: for example, in the case of a signal provided by an accelerometer and/or a gyroscope, in particular contained in the telephone device, it may be indicative of the spatial orientation (e.g., vertical, horizontal or tilted) of the device itself at the end of a phone call.

The signal supplied by the accelerometer and/or gyroscope (preferably of the three-dimensional type) may also be indicative of any acceleration undergone by the mobile telephone device, as may occur in the event of a fall, a shock, or the like.

It must also be pointed out that, as will become apparent hereinafter, the signal based on which the possibility of making calls is temporarily inhibited may also be a signal supplied by other sensors, e.g., a magnetometer, a proximity sensor, a temperature sensor, etc.

It should also be added that, in accordance with the invention, one or more signals may be used in combination to activate the temporary call inhibition function; this means that one may use combinations of signals provided by the accelerometer and/or the gyroscope and/or the magnetometer and/or the proximity sensor and/or the temperature sensor, or even by an earphone or a microphone external to the mobile telephone device.

All of the above-mentioned sensors are normally comprised in mobile telephone devices of the smartphone type; therefore, the method of the invention can be implemented in products that are commercially available, i.e., on a large scale for a large number of users.

Typically, if after the end of a phone call the spatial orientation of the mobile telephone device remains substantially the same for a predetermined time (e.g., one or more tens of seconds), it can be assumed that the phone is not being used by the user and that the icon or control that starts another call after the one just completed has been touched accidentally, and therefore that the new call is unintentional.

In such situations, the method of the invention, when applied to the mobile device, can prevent the making of undesired calls.

It should be noted that this effect is temporary, i.e., it lasts for a preset time interval preferably comprised between the end of a call and the beginning of the locking or darkening condition of the telephone device, also commonly known as "stand-by".

This latter condition is the one that occurs after a certain time has elapsed during which the phone is not in use, usually about one minute (but it can be changed by the user), after which the display goes dark and no calls can be made (except for emergency calls); in order to unlock the phone from this condition, it is necessary to type in a code or to perform a user recognition procedure (via fingerprint or iris reading, or the like).

The method according to the present invention operates in a phase that precedes the "stand-by" phase, by inhibiting fortuitous or anyway undesired calls; it starts at the end of a phone call, following the occurrence of actions, gestures or situations that somehow concern or involve the user.

Thus, for example, in addition to the aforesaid signal indicating the spatial orientation of the device, temporary call inhibition may be obtained by exploiting also an interaction signal, i.e., a signal associated with, or generated by, one or more actions performed by the user after the end of a call, indicating that the user does not want to make a new call.

These are interactions that may cause the operating condition of the mobile telephone device to change; for example, a signal representing the position and/or the orientation of the earphones (used in conversation) after the end of the call; or a signal representing the path followed by the mobile telephone device after the end of a call, wherein said interaction signal allows understanding what is going on with the mobile telephone device after a phone call.

Let us consider, for example, the case wherein, though held in the user's hand, the phone moves because the user has a trembling hand, and such tremor can be sensed by the accelerometer or by the gyroscope, which will thus change its own operating state and emit a corresponding signal.

In this manner, in addition to establishing the spatial orientation of the mobile telephone device, the detection of a given type of interaction between the mobile telephone device and the user can avoid the making of (undesired) calls after the end of a call.

The features of the present invention will be more specifically set out in the appended claims.

BRIEF DESCRIPTION OF THE DRAWINGS

These features as well as further advantages of the present invention will become more apparent from the following description of a preferred, though non-limiting, embodiment thereof as shown in the annexed drawings, which are supplied merely by way of non-limiting example, wherein.

DETAILED DESCRIPTION OF THE PREFERRED EMBODIMENTS

Before proceeding any further, it may be appropriate to point out that, in this description, any reference to "an embodiment" will indicate that a particular configuration, structure or feature is to be considered as comprised in at least one embodiment of the invention. Therefore, expressions like "in an embodiment" and the like, which may be present in different parts of this description, will not necessarily be all related to the same embodiment, so that the various configurations, structures or features described herein may be combined in one or more embodiments as deemed appropriate.

Finally, attention is drawn to the fact that the alphanumerical references used below are intended to facilitate the understanding of the invention, without limiting the protection scope and the extent of the claimed embodiments.

Figure 1:
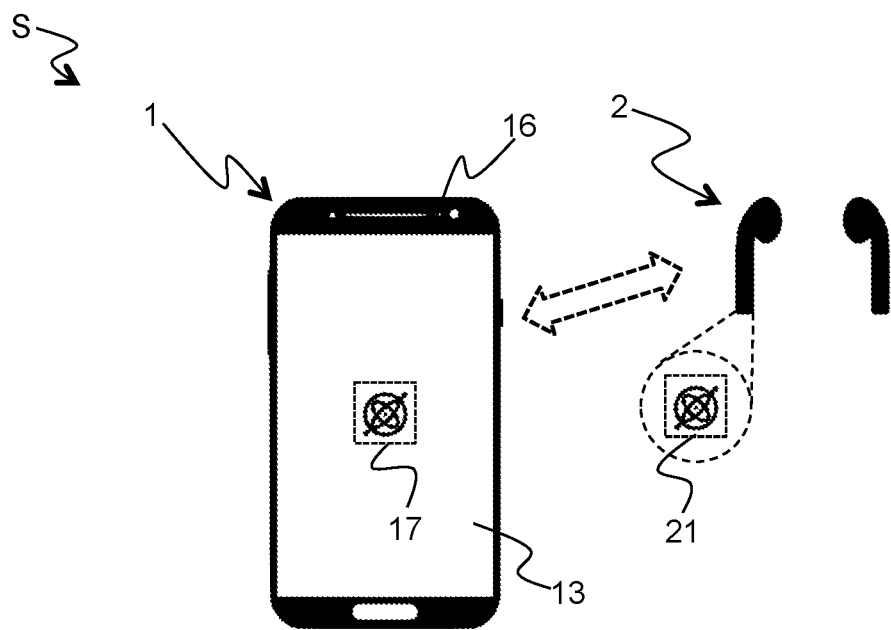
FIG. 1 shows a communication system comprising a mobile telephone device according to the invention.
Figure 2:
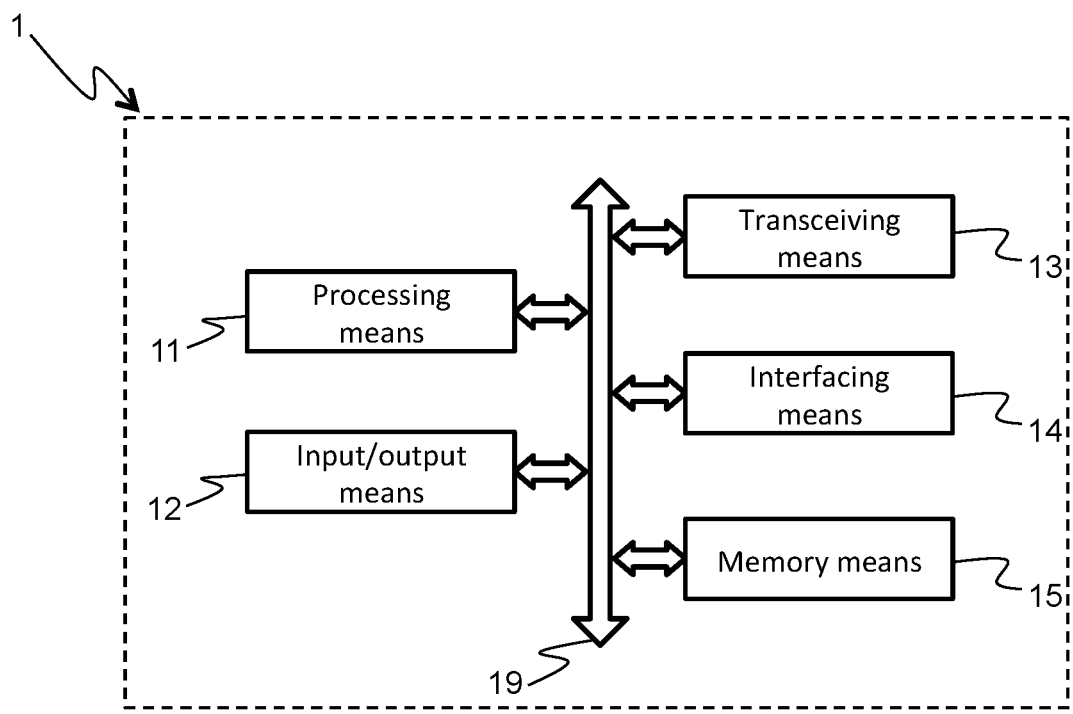
FIG. 2 shows a block diagram representing some parts of the mobile telephone device of FIG. 1.

With this in mind, it can be stated that, with reference to FIGS. 1 and 2, the following will describe a communication system S comprising at least one mobile telephone device 1 (e.g., a smartphone, a tablet, or the like) made in accordance with the invention.

The mobile telephone device 1 comprises, among other things, the following parts or components:
  processing means 11 (e.g., a CPU, a CPLD, an FPGA, a microcontroller, or the like) for processing data and executing commands and instruction programs;
  input and/or output means 12 (e.g., a USB, Firewire, RS232, Bluetooth®, WiFi controller, or the like), capable of acquiring input signals and/or emitting output signals;
  transceiving means 13 adapted to transmit and receive, through a communications network (preferably a GSM, GPRS, EDGE, UMTS, LTE, 5G, WiFi network, or the like), phone calls, e.g., via switched network or VoIP service;
  interfacing means 14 (e.g., a touchscreen, an alphanumeric keyboard comprising a call hang-up button, a microphone/loudspeaker system, or the like) allowing interactions with a user of said mobile telephone device 1;
  memory means 15 (e.g., a RAM, ROM, Flash memory, or the like) capable of storing data and/or a set of instructions implementing and permitting the phases of a method for inhibiting undesired calls according to the invention;
  a communication bus 19 for exchanging data and information between at least two of the above-mentioned means or elements 11-15.

The processing means 11 are preferably configured to carry out the following operating steps:
  terminating a phone call upon a command sent to and/or received by said mobile telephone device 1. Termination of the phone call can be accomplished in several ways: for example, by the user actuating one of the interfacing means 14 (normally the user touches a specific icon displayed on a touchscreen, or presses a button of a wired or wireless earphone in communication with the mobile telephone device 1 through a Bluetooth® network or the like), or by the transceiving means 13 receiving a call hang-up signal, e.g., due to the interlocutor hanging up, or when the signal is lost, or due to other reasons;
  acquiring, through the input means 12, a signal representing or associated with at least one quantity relating to one or more of the following options:
    i) the environment surrounding the mobile telephone device 1 (e.g., background noise, vibrations, temperature etc.);
    ii) an external apparatus in communication with the mobile telephone device 1 (e.g., earphones, microphone, Bluetooth® or Wi-Fi connections);
    iii) an operating condition of said mobile telephone device 1 (e.g., spatial orientation of said mobile telephone device 1 after the end of a phone call).

Preferably, the operating signal is obtained by acquiring and processing data generated by sensors 17 combined, even only partially, with one another; such sensors 17 comprise an accelerometer (preferably of the three-dimensional type or the like) and/or a gyroscope and/or a magnetometer and/or a proximity sensor and/or a temperature sensor, all such sensors being normally comprised in latest-generation telephone devices (smartphones, tablets, etc.), like the mobile telephone device 1.

The data provided by the sensors 17 permit the following:
  estimating the spatial orientation of said telephone device 1 on the basis of, for example, the direction of action of gravity or of the terrestrial magnetic field, or the proximity of the device to the user's face, or by judging whether or not the device is stationary, e.g., resting on a table;

determining a duration of a time interval in which said orientation signal represents a substantially stable orientation of the mobile telephone device 1. For example, this can be done by calculating the time for which the first derivatives with respect to the time of the spatial orientation signal remain below a threshold, preferably equal to at least ten sexagesimal degrees per second;

preventing, for a preset time interval, calls from being made by the mobile telephone device 1 on the basis of said operating signal; for example, this can be done by calculating the time for which the first derivatives with respect to the time of the spatial orientation signal remain below a preset threshold, preferably equal to at least ten sexagesimal degrees per second, and preventing the activation of any phone calls if the duration of said interval exceeds a threshold, preferably equal to at least 10 seconds.

In this phase, the telephone device 1 temporarily denies access to the function that allows making calls or, as an alternative, it may restore the condition in which calls are enabled if the spatial orientation signal changes substantially relative to an idle position, or it may request an unlocking code for making a new call or other actions (e.g., sending text or voice messages).

In this way it is possible to avoid making undesired calls after having just terminated a call.

It must however be pointed out that, when the telephone device is in this temporary call inhibition phase, any incoming calls will nevertheless be enabled, as if the telephone device were not in said temporary inhibition phase.

It should be noted that the functions performed by the processing means 11 are preferably associated or implemented through an application (a so-called "App") stored in the memory means 15 or anyway associated with the telephone device 1; such application can preferably be activated by means of a command, which may also be a voice command and/or a command executed by touching an icon displayed on the interfacing means 14.

Figure 3:
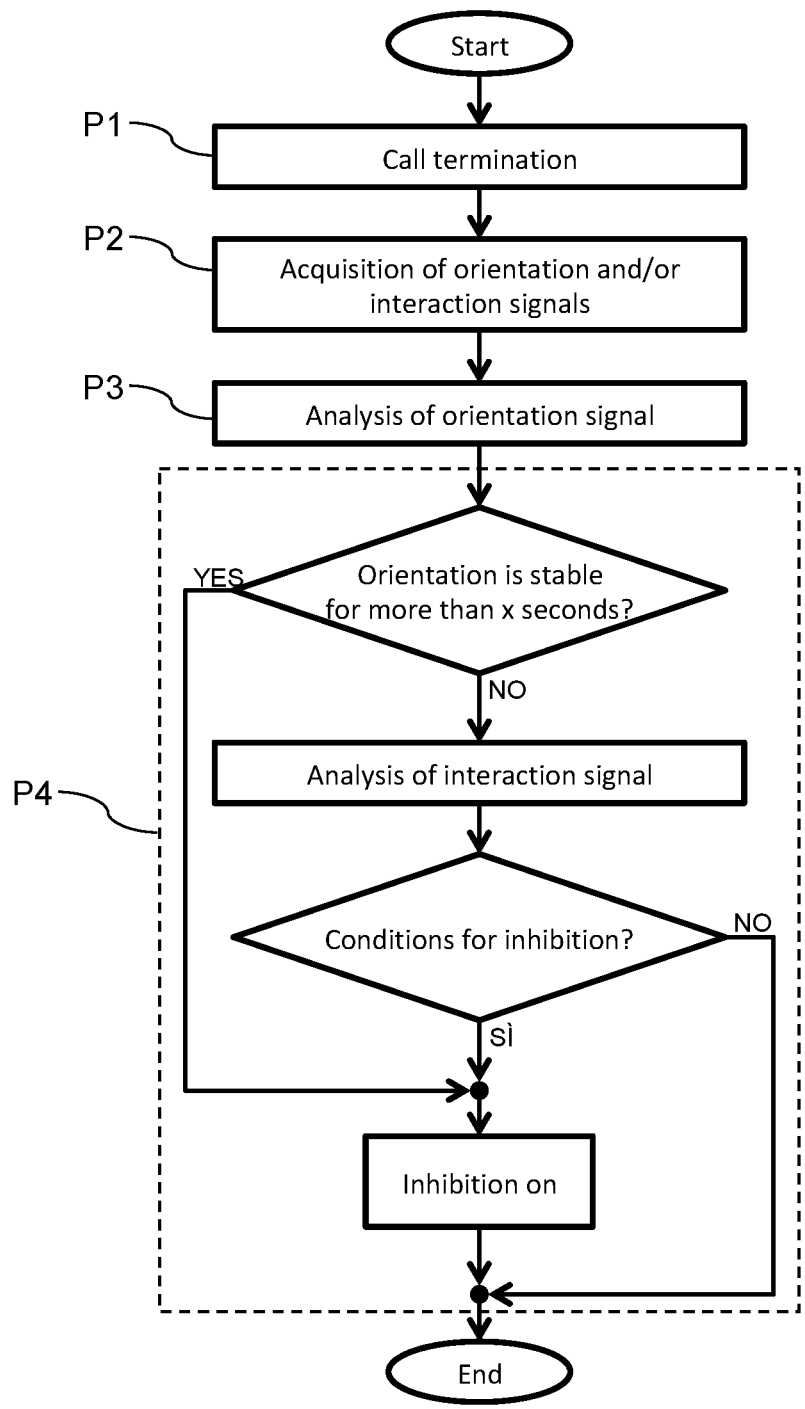
FIG. 3 shows a flow chart representing the phases of an embodiment of a method according to the invention.

From a functional viewpoint, the above-described operating phases are illustrated in the diagram shown in FIG. 3.

As can be seen, when the mobile telephone device 1 is in an operating condition, the processing means 11 preferably execute the set of instructions contained in the memory means 15, which implement the phases of the method for inhibiting undesired calls according to the invention.

Said method essentially comprises the following phases:

a call termination phase P1, wherein a user terminates a phone call through a command sent to, and/or received by, said mobile device 1;

an acquisition phase P2, wherein at least one operating signal generated at the end of a first call is acquired via input means 12;

a temporary inhibition phase P4, wherein the processing means 11 prevent making calls through the mobile telephone device 1, for a preset time interval, on the basis of said operating condition signal.

It is thus possible to avoid making undesired calls for a preset time after the end of a call. Such preset time may start two or three seconds after the end of the call, which is the time typically necessary for putting the phone down on a table or into a pocket or for removing earphones, or it may also be longer.

In a preferred embodiment, the operating signal comprises an orientation signal that represents a spatial orientation (i.e., vertical, horizontal, tilted) of the mobile telephone device 1.

For example, in one possible embodiment of the invention an analysis phase P3 is also envisaged, wherein the processing means 11 determine (after the start or the end of the acquisition phase P2) the duration of a time interval during which the spatial orientation signal is representative of a substantially stable operating condition of the mobile telephone device 1 or the interaction signal indicates the user's intention of not making a new call.

For example, this can be done by calculating the first derivatives with respect to the time of the orientation signal, if the orientation data are generated by the accelerometric and/or gyroscopic means 17 or by a magnetometer.

Afterwards, during the phase P4, making calls through the mobile telephone device 1 will be prevented if the (average or punctual) value of such derivatives is greater or smaller than a given threshold, preferably for a period of time of at least 5-10 seconds.

This makes it possible to avoid most undesired calls after the conclusion of a call, which are due to the fact that, after the end of a call, the user may inadvertently touch the touchscreen of the mobile device 1, e.g., while putting it into a pocket or a bag, or because of an accidental gesture or inattention.

It must also be pointed out that the above-mentioned operating phases of the method of the invention are carried out during a time interval that precedes the instant when the telephone device 1 enters the idle or paused condition, commonly known as "stand-by"; this paused condition comes on after a preset time (usually one minute, but it may differ according to the phone model or to user's selections), and its activation implies the darkening of the touchscreen and the resulting locking of all functions (except a few, such as emergency calls), so that, in order to restore such functions, it will be necessary to unlock the device by entering an access code or by performing the recognition of the user's fingerprint, iris or face.

The present invention operates prior to the "stand-by" phase, when all the normal functions of the telephone device 1 are accessible through its interface, which in smartphone-type telephones is a touchscreen.

In accordance with the above, the operating signal acquired through the input means 12 during the acquisition phase P2 comprises an interaction signal representing a user's reaction that follows the end of a phone call, which may cause the operating condition of the mobile telephone device 1 to change, so that, during the temporary inhibition phase, making unintentional calls is prevented on the basis of said interaction signal, e.g., in case inhibition has not yet been set during said inhibition phase P4 on the basis of the orientation signal.

It must be highlighted that the orientation signal and the interaction signal may also be evaluated in parallel, as opposed to sequentially as shown in FIG. 3.

In other words, during the temporary inhibition phase P4 it is evaluated, through processing means 11, if calls should be inhibited on the basis of the interaction signal and, if the outcome of the evaluation is positive, making calls through the mobile telephone device 1 will be temporarily prevented by the processing means 11.

The interaction signal, which indicates the user's intention of not making a new call, may for instance comprise a (proximity) signal generated by a proximity sensor (preferably of the infrared-sensitive type) that may be comprised in said mobile telephone device 1, which signal represents the distance of a human body (e.g., the user's face) from the front portion of the mobile telephone device 1, or other signals as well, some of which will be described hereinafter.

In this way it is possible to reduce the risk of making undesired calls after having just terminated a call.

In a preferred embodiment of the invention, the mobile telephone device 1 comprises accelerometric and/or gyroscopic sensor means 17, such as, for example, a sensor belonging to the ICM-206XX or MPU-6XXX families, manufactured by TDK Inven Sense, wherein the accelerometric and/or gyroscopic means 17 are configured for generating (during the acquisition phase P2) the orientation signal representing the spatial orientation of said device 1, e.g., by determining the direction of action of terrestrial gravity (using the accelerometric means) and/or by integrating in time the angular speed data coming from the gyroscopic means 17 and adding them to the data about an initial orientation.

As an alternative to or in combination with the accelerometric and/or gyroscopic means 17, the mobile telephone device 1 may also comprise a magnetometer generating the orientation signal representative of the orientation of the mobile telephone device 1 with respect to the terrestrial magnetic field.

More in detail, the processing means 11 may be configured for obtaining (during the analysis phase P3) an orientation datum that defines the spatial orientation of the device 1, i.e., if the phone has been resting for a certain period of time on a flat surface, or has been put into a pocket, or has been held in the user's hand for a certain time since the end of a call.

The accelerometric and/or gyroscopic means 17 also generate, preferably in co-operation with the proximity sensor and/or the temperature sensor, the interaction signal that allows understanding the user's reaction at the end of the call, e.g., by analyzing a first portion of the signal generated by the accelerometric and/or gyroscopic means 17 for a predefined time interval starting from the instant when the call is terminated, and using the subsequent signal portion to determine the spatial orientation of the mobile telephone device 1.

In other words, the accelerometric and/or gyroscopic means 17 generate a signal (preferably in digital format) that represents the spatial orientation of said mobile telephone device 1 and that comprises a first portion and a second portion, chronologically consecutive to each other.

The processing means 11 are configured for generating (during the acquisition phase P2) the (user) interaction signal on the basis of said first portion, e.g., by copying and/or downsampling and/or filtering and/or the like; and the orientation signal on the basis of said second portion (e.g., by copying and/or downsampling and/or filtering and/or the like). This allows the processing means 11 to evaluate (during the temporary inhibition phase P4) situations concerning the user; for example, if the person holding the phone 1 has a trembling hand after having hung up and before putting the phone down on a flat surface, or if the phone undergoes any shocks or hits (due to falling, accidental movements, or the like).

In fact, a user, after having terminated a call, may suffer from tremors (due to indisposition, an altered emotional state or any other reason), or he/she may drop the telephone device 1 or bump it against another object (whether accidentally or not); in such situations, it is appropriate to (temporarily) inhibit communications, so as to avoid that any number in the phone book might be called unintentionally.

In this respect, it must be pointed out that such tremors can be detected from the signal produced by the accelerometric and/or gyroscopic means 17 or by the magnetometer, by analyzing the frequency of said signal.

In addition to the above, the accelerometric and/or gyroscopic means 17, as well as any other sensors in use (like the magnetometer), may also allow detecting other situations of interest for the purposes of the invention.

For example, this is the case when, at the end of a call, the user is walking or running; in such circumstances, it is better to inhibit the making of calls before the phone automatically switches to stand-by mode, because it is more likely that calls might inadvertently be made, due to fortuitous touches or contact on the screen by the user (as he/she is trying to put the device 1 into a pocket or is making other gestures).

In accordance with the invention, when the user is walking or running, the jolts caused by his/her steps are sensed by the accelerometric/gyroscopic sensors 17, and the call inhibition procedure (routine) is started; in this regard, it must be noted that the presence of energy in the frequency spectrum of the interaction signal within the range of 0.5 Hz to 3.5 Hz is typical of a walking or running cadence.

Thus, the signal supplied by the accelerometric and/or gyroscopic means 17 allows the processing means 11 to detect one or more of the above-described situations, so that undesired calls can be prevented after the end of a call.

As an alternative or in addition to the above, the communication system S may comprise one or more earphones 2 (preferably a pair) in signal communication with the mobile telephone device 1, preferably via Bluetooth® network, or otherwise via cable.

Each one of the earphones 2 comprises second accelerometric and/or gyroscopic means 21 configured for producing a second accelerometric and/or gyroscopic signal, which is representative of the accelerations and/or rotations and/or movements to which each earphone is subjected; this signal is, at least partly, sent to the mobile device 1: for this reason, the second accelerometric and/or gyroscopic means 21 are preferably of a type similar to those 17 of the mobile device 1.

More in detail, the processing means 11 may be configured for detecting some of the above-described situations (e.g., a walking user) by using the second signal generated by the second accelerometric and/or gyroscopic means 21 as an interaction signal, instead of (or in combination with) the one generated by the accelerometric and/or gyroscopic means 17 of the telephone device 1.

In such a case, the interaction signal, which indicates the user's intention of not making a new call, comprises said second accelerometric and/or gyroscopic signal, and the processing means 11 may be configured for executing the following steps:

detecting (during the acquisition phase P2) that the earphones 2 have been removed (by the user of the device 1) from the user's ears after the end of the call, on the basis of the interaction signal;

inhibiting (during the temporary inhibition phase P4) the making of calls through said mobile device 1 if said earphones 2 have been removed; this means that earphone removal is a condition necessary and sufficient for generating said inhibition datum.

In particular, if both earphones 2 are equipped with respective accelerometric and/or gyroscopic means 21 and the interaction signal comprises both signals generated by them, the processing means 11 may be configured for detecting (during the acquisition phase P2) that both earphones 2 have been removed (by the user of the device 1) in a synchronous manner, i.e., both earphones are subjected to rotations in opposite directions and, preferably, also to rotations and/or accelerations of similar intensity.

This makes it possible to inhibit the making of calls through the mobile device 1 for some time after terminating a call, if the processing means 11 detect that the mobile telephone device 1 has been put into a pocket or laid on a table (by using the spatial orientation signal) and/or that the earphones have been removed (by using the interaction signal); in fact, in this situation it is clear that the user has no intention of making a new call. It is thus possible to avoid making (undesired) calls after the conclusion of a previous call.

As an alternative to or in combination with said second accelerometric and/or gyroscopic means 21, each earphone 2 may comprise a proximity sensor (preferably of the infrared-sensitive type) configured for generating a proximity signal indicating whether the earphone is hooked to the user's ear or not. In this variant, the interaction signal comprises the proximity signal, and the processing means 11 are configured for detecting (during the acquisition phase P2) the removal of at least one of said earphones 2 on the basis of said proximity signal. In this way it is possible to avoid making undesired calls after having terminated a call and having removed at least one earphone 2.

As an alternative to or in combination with the proximity sensor, each earphone 2 may comprise a pressure sensor (preferably of the piezoelectric type) configured for generating a pressure signal indicating whether the earphone 2 is coupled to the user's ear canal or not; in fact, the pressure sensor may be coupled to a contact portion of each earphone, i.e., that portion of the earphone 2 which becomes deformed as it physically comes in contact with the ear canal of the user; such portion may preferably be made of rubber (preferably silicone rubber) and may have a shape similar to that of those components known as "earbuds", which can be replaced when worn out or for hygienic reasons (e.g., when said earphones are handed over to another user).

In this variant, the interaction signal comprises the pressure signal, and the processing means 11 are configured for detecting (during the temporary inhibition phase P4) the removal of at least one of said earphones 2 on the basis of said pressure signal. In this way it is possible to avoid making undesired calls for a certain time after having terminated a previous call.

As an alternative to or in combination with the above, the mobile telephone device 1 and/or at least one of said earphones 2 may comprise audio acquisition means configured for sensing pressure waves in the environment surrounding said mobile device 1, preferably within the human hearing range, and for generating an audio signal, preferably in digital format. In this variant, the interaction signal comprises said audio signal.

More in detail, the processing means 11 may be configured for detecting (during the acquisition phase P2) any background noise in said audio signal (interaction signal) and inhibiting calls (during the temporary inhibition phase P4) if the energy of said background noise exceeds a (second) threshold. In this way it is possible to avoid making calls, after having just terminated a call, when the user is in a noisy environment; in such a context, in fact, it is difficult to talk and perceive audio signals coming from the phone (e.g., ringtone, signals, or the like).

Of course, the example described so far may be subject to many variations.

Although this description has tackled some of the possible variants of the invention, it will be apparent to those skilled in the art that other embodiments may also be implemented, wherein some elements may be replaced with other technically equivalent elements. The present invention is not therefore limited to the illustrative examples described herein, since it may be subject to many modifications, improvements or replacements of equivalent parts and elements without departing from the basic inventive idea, as set out in the following claims.

In one variant, when the mobile telephone device 1 is in a situation of temporary inhibition of outbound calls, the other functions of the device, such as the ringtone and other functions, may still be operational.

In another variant, the mobile telephone device 1 is configured for immediately exiting the condition of temporary inhibition of outbound calls when said mobile telephone device 1 is moved, thus changing the value of the orientation signal, even if the predetermined period of time during which outbound calls should be inhibited has not elapsed yet.

The invention claimed is:

1. A method for inhibiting calls from a mobile telephone device,
   the method comprising:
   an acquisition phase for acquiring at least one operating signal generated after the end of a call, relating to the mobile telephone device and/or to a user interaction therewith, wherein said acquisition phase starts after said end of a call and precedes a stand-by phase;
   a temporary inhibition phase, wherein, based on said at least one acquired signal, any further calls through the mobile telephone device are prevented for a preset time interval,
   wherein said temporary inhibition phase precedes said stand-by phase,
   wherein said operating signal comprises an accelerometric and/or gyroscopic type and comprises a first portion and a second portion chronologically consecutive to each other, wherein during the acquisition phase said first portion comprises an interaction signal representative of a user's action following the end of a phone call interaction signal, and said second portion comprises an orientation signal representing a spatial orientation of said mobile telephone device.

2. The method according to claim 1, wherein the temporary inhibition phase is associated with the detection that said at least one operating signal has been stable for a given time at the end of a call.

3. The method according to claim 1, wherein said at least one operating signal comprises an orientation signal representing the spatial orientation of said mobile telephone device.

4. The method according to claim 1, wherein said at least one operating signal is representative of, or associated with, a quantity relating to one or more of:
   i) the environment surrounding the mobile telephone device;
   ii) an external apparatus in communication and/or connection with the mobile telephone device;
   iii) the operating state of said mobile telephone device.

5. The method according to claim 4, wherein the external apparatus comprises at least one of: an earphone, a microphone, bluetooth®, or wi-fi connection.

6. The method according to claim 4, wherein the state of said mobile telephone device comprises at least one of: speed, acceleration, forces or stresses that the mobile telephone device is subjected to.

7. The method according to claim 4, wherein the quantity relating to the surrounding environment comprises at least one of sound emissions, vibrations, temperature.

8. The method according to claim 1, wherein said operating signal is generated by sensor means contained in the mobile telephone device.

9. The method according to claim 1, comprising an analysis phase, wherein a value is calculated for the duration of a time interval in which said signal of the operating condition of the mobile telephone device is representative of a substantially stable orientation of said mobile telephone device, and wherein, during the temporary inhibition phase, the making of calls through the mobile telephone device is inhibited if the duration of said interval exceeds said calculated time value.

10. The method according to claim 1, wherein said operating signal comprises an interaction signal representative of a user's action following the end of a phone call, which may cause the dynamic state of said mobile telephone device to change.

11. The method according to claim 1, wherein said at least one signal is determined by the interruption of the connection and/or communication between an earphone, a microphone or the like and the mobile telephone device.

12. The method according to claim 1, wherein said operating signal comprises an accelerometric/gyroscopic signal generated by accelerometric/gyroscopic means associated with an earphone in connection and/or communication with the mobile telephone device, and wherein the interaction signal is determined by movements to which the earphone is subjected.

13. The method according to claim 1, comprising a signal acquisition phase, wherein background noise associated with the terminated phone call is detected, and wherein, during the temporary inhibition phase, other calls cannot be made through the mobile telephone device if the energy of said background noise exceeds a preset threshold.

14. A mobile telephone device comprising:
- a processor for processing data and executing commands and instruction programs;
- an input receiver and/or an output transmitter capable of acquiring input signals and/or emitting output signals;
- a transceiver capable of transmitting and receiving phone calls through a communications network, whether via switched network or VoIP service;
- an interface allowing interactions with a user of said mobile telephone device;
- memory capable of storing data and/or a set of instructions implementing and permitting the phases of a method for inhibiting undesired calls;
- a communication bus for exchanging data and information between at least two of the above-mentioned means,
- wherein in order to avoid making undesired calls, calls from said mobile telephone device are inhibited for a predetermined period of time after the end of a previous call, if a signal indicative of the mobile telephone being in a substantially stable orientation remains stable for a preset time, said indicative signal being generated by said processor,
- wherein said indicative signal is generated after of said end of said previous call and precedes a stand-by phase, and
- wherein said inhibition precedes said stand-by phase.

15. A method telephone device, comprising:
- input means for acquiring input signals,
- processing means in communication with said input means,
wherein the processing means are also configured for executing the phases of the method according to claim 1.

16. A method for inhibiting calls from a mobile telephone device, the method comprising:
- an acquisition phase for acquiring at least one operating signal generated after the end of a call, relating to the mobile telephone device and/or to a user interaction therewith, wherein said acquisition phase starts after said end of a call and precedes a stand-by phase;
- a temporary inhibition phase, wherein, based on said at least one acquired signal, any further calls through the mobile telephone device are prevented for a preset time interval,
- wherein said temporary inhibition phase precedes said stand-by phase,
- wherein acquiring said at least one operating signal comprising measuring a duration of a time interval in which said at least one operating signal is representative of the mobile telephone device being in a substantially stable orientation, and wherein, during the temporary inhibition phase, the making of calls through the mobile telephone device is inhibited if the measured duration of the time interval exceeds a preestablished time value.

17. A method for inhibiting calls from a mobile telephone device, the method comprising:
- an acquisition phase for acquiring at least one operating signal generated after the end of a call, relating to the mobile telephone device and/or to a user interaction therewith, wherein said acquisition phase starts after said end of a call and precedes a stand-by phase;
- a temporary inhibition phase, wherein, based on said at least one acquired signal, any further calls through the mobile telephone device are prevented for a preset time interval,
- wherein said temporary inhibition phase precedes said stand-by phase,
- wherein said operating signal comprises an accelerometric/gyroscopic signal generated by accelerometric/gyroscopic means associated with an earphone in connection and/or communication with the mobile telephone device, and wherein the operating signal is determined by movements to which the earphone is subjected.

* * * * *